2 Sheets--Sheet 1.

A. P. GROSS.
Improvement in Mode of Lubricating Machinery.

No. 132,395. Patented Oct. 22, 1872.

Witnesses,
N. E. Hilton
F. J. Trapp

Inventor
Alexander P. Gross

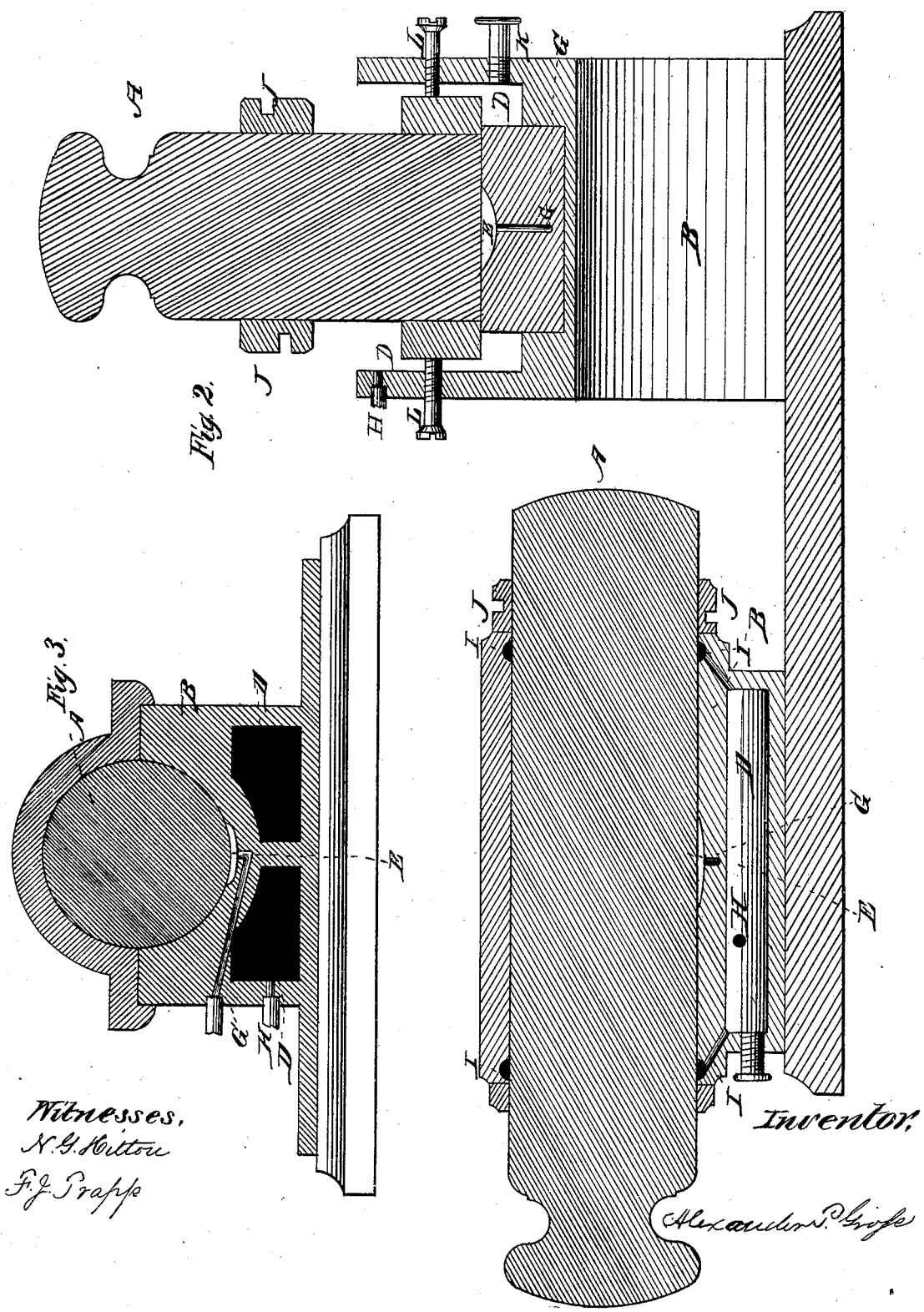

UNITED STATES PATENT OFFICE.

ALEXANDER P. GROSS, OF VALLEJO, CALIFORNIA.

IMPROVEMENT IN MODES OF LUBRICATING MACHINERY.

Specification forming part of Letters Patent No. 132,395, dated October 22, 1872.

*To all whom it may concern:*

Figure 1:
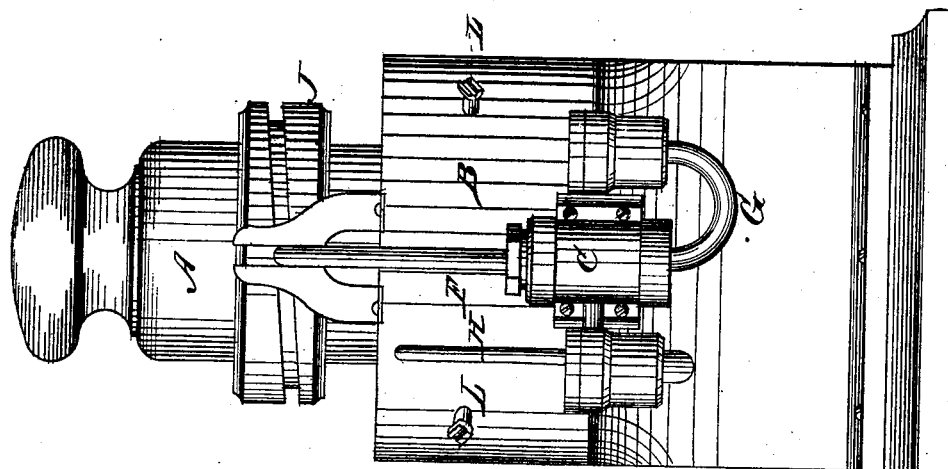
Figure 1:
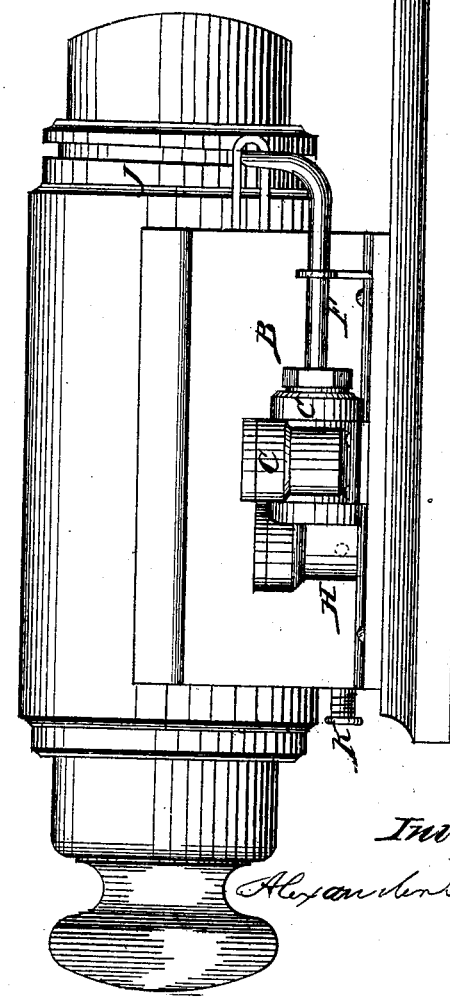

Be it known that I, ALEXANDER P. GROSS, of Vallejo, in the county of Solano and State of California, have invented an Improved Mode of Lubricating Machinery, of which the following is a specification:

Figure 1, Sheet I, shows an elevation of both a horizontal and vertical shaft, and bearings therefor, provided with my lubricating apparatus; Fig. 2, Sheet II, is a sectional elevation of the same; and Fig. 3 a central cross-section of the horizontal shaft and its bearings, &c.

My invention relates to the application of the principle of the hydrostatic press in the lubrication of journal or shaft bearings of every description; and it consists in the mode of effecting this by the construction hereinafter described.

In the drawing, A indicates both the horizontal and vertical shaft, and B the pillow or bearing-block. A suction and force pump, C, of ordinary or suitable construction, is connected with the bearings, (or otherwise arranged so as to be effective for its purpose,) and its piston-rod F is curved inward at its outer end so as to enter and work in a cam-groove in a circular collar, J, which is secured on the shaft A. The lubricant is contained in a chamber, D, from which the pipe H leads to the pump. The pipe G leads from the pump to a cavity, E, beneath the shaft. L L are screws for adjusting the lower end of the vertical shaft.

To operate the apparatus, the chamber D is supplied with oil or other preferred lubricant and the shaft set in motion, which causes the reciprocation of the pump-piston through the medium of the grooved collar and the piston-rod. By this means the oil is received into the pump-cylinder through the pipe H and forced out through the pipe G into the cavity E, whence it spreads laterally beneath the shaft into the grooves I and returns to the reservoir D or passes directly into the said reservoir, according as the shaft is horizontal or vertical. Upon the well-known principle of hydrostatics, viz., that the amount of force obtained by pressing a liquid through a pipe of a given diameter is proportionate to the relative areas of the piston and the opposing surface upon which the liquid acts, it will be seen that but slight force will be required to enable the pump C to drive the oil into cavity E and thence between the shaft and bearing-surface, so that there shall be no actual contact between them. It is equally apparent that the result will be what is desired, viz., a minimum amount of friction, or retardation of the velocity of the revolution of the shaft under the application of a given power, thus effecting an economy in fuel, and in the wear of machinery.

In constructing machinery to which this apparatus is to be applied it will be advisable or necessary to determine the approximate weight of the shaft and its immediate connections, and make the oil-cavity beneath it of proportionate area—the end in view being to raise the shaft by the force applied. The form or shape of the recess is unimportant. The oil remains in good order for months, while by the old process it becomes useless in a short time. Of course the same principle of lubrication applies to sliding shafts.

Having thus described my invention, what I claim as new, and desire to secure by Letters Patent, is—

1. The combination of a pump, C, an oil-reservoir, pipes G H, cavity E, shaft A, rod F, and cam-grooved collar J, substantially as shown and described.

2. The mode of lubricating shafts or bearing-surfaces by means of a pump and connected pipes and oil-reservoir, constructed to operate on the hydrostatic principle, substantially as specified.

ALEXANDER P. GROSS.

Witnesses:
PAUL K. HUBBS,
N. G. HILTON.